US010740154B2

(12) United States Patent
Zeng

(10) Patent No.: US 10,740,154 B2
(45) Date of Patent: *Aug. 11, 2020

(54) METHOD AND APPARATUS FOR ALLOCATING COMPUTING RESOURCES OF PROCESSOR BASED ON PROCESSOR LOAD, AND TERMINAL

(71) Applicant: Guangdong Oppo Mobile Telecommunications Corp., Ltd., Dongguan, Guangdong (CN)

(72) Inventor: Yuanqing Zeng, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 134 days.

This patent is subject to a terminal disclaimer.

(21) Appl. No.: 16/110,319

(22) Filed: Aug. 23, 2018

(65) Prior Publication Data

US 2018/0365066 A1    Dec. 20, 2018

Related U.S. Application Data

(63) Continuation of application No. PCT/CN2017/086447, filed on May 27, 2017.

(30) Foreign Application Priority Data

May 31, 2016    (CN) .......................... 2016 1 0380703

(51) Int. Cl.
G06F 9/46        (2006.01)
G06F 9/50        (2006.01)
(Continued)

(52) U.S. Cl.
CPC .............. G06F 9/505 (2013.01); G06F 1/329 (2013.01); G06F 1/3243 (2013.01); G06F 9/50 (2013.01);
(Continued)

(58) Field of Classification Search
None
See application file for complete search history.

(56) References Cited

U.S. PATENT DOCUMENTS

2005/0289365 A1    12/2005    Bhandarkar
2011/0271124 A1*   11/2011    Verdun ................ G06F 1/3203
                                                          713/300
(Continued)

FOREIGN PATENT DOCUMENTS

CN    101446856 A    6/2009
CN    103838353 A    6/2014
(Continued)

OTHER PUBLICATIONS

Extended European search report issued in corresponding European application No. 17805797.2 dated Apr. 18, 2019.

*Primary Examiner* — Bradley A Teets

(57) ABSTRACT

A method for allocating computing resources of a processor is provided. The method includes the follows. A current processor load is detected. Required computing resources are determined according to the current processor load. The required computing resources correspond to a total frequency of each processor core. Priori power values of each processor core at different frequencies are obtained. The number of processor cores and a frequency of each processor core are determined according to the priori power values of each processor core at different frequencies, such that a total frequency of each processor core satisfies the computing resources and a total power value of each processor core is minimum.

16 Claims, 3 Drawing Sheets

(51) Int. Cl.
  *G06F 1/3234*   (2019.01)
  *G06F 1/329*    (2019.01)
(52) U.S. Cl.
  CPC ............ *G06F 9/5094* (2013.01); *Y02D 10/22*
              (2018.01); *Y02D 10/36* (2018.01)

(56)         References Cited

U.S. PATENT DOCUMENTS

2013/0013911 A1   1/2013  Gustafsson
2015/0286266 A1  10/2015  Shrall et al.
2017/0220944 A1   8/2017  Nghiem
2018/0365066 A1  12/2018  Zeng

FOREIGN PATENT DOCUMENTS

CN       104820618 A    8/2015
EP        2624098 A2    8/2013

* cited by examiner

METHOD AND APPARATUS FOR ALLOCATING COMPUTING RESOURCES OF PROCESSOR BASED ON PROCESSOR LOAD, AND TERMINAL

CROSS-REFERENCE TO RELATED APPLICATION(S)

This application is a continuation of International Application PCT/CN2017/086447, filed on May 27, 2017, which claims priority to Chinese Patent Application No. 201610380703.0, filed on May 31, 2016, the contents of both of which are herein incorporated by reference in their entireties.

TECHNICAL FIELD

The present disclosure relates to the field of terminals, and particularly to a method and an apparatus for allocating computing resources of a processor, and a terminal.

BACKGROUND

With a continuous development of processor technology, multi-core technology has become an important direction for current processor development. Compared with related single-core chips, the multi-core processor technology improves system's performance greatly with multiple processing cores' mutual assistance when a frequency is kept constant.

SUMMARY

According to a first aspect of implementations of the present disclosure, there is provided a method for allocating computing resources of a processor. The method includes the follows.

A current processor load is detected. Required computing resources are determined according to the current processor load. The required computing resources correspond to a total frequency of each processor core. Priori power values of each processor core at different frequencies are obtained. The number of processor cores and a frequency of each processor core are determined according to the priori power values of each processor core at different frequencies, such that a total frequency of each processor core satisfies the computing resources and a total power value of each processor core is minimum.

According to a second aspect of the implementations of the present disclosure, there is provided a terminal device, which includes at least one processor and a computer readable storage coupled to the at least one processor. The computer readable storage stores at least one computer executable instruction thereon, which when executed by the at least one processor, cause the at least one processor to carry out actions, including: detecting a current processor load; determining required computing resources according to the current processor load, the required computing resources corresponding to a total frequency of each processor core; obtaining priori power values of each processor core at different frequencies; determining the number of processor cores and a frequency of each processor core according to the priori power values of each processor core at different frequencies, with a total frequency of each processor core satisfying the required computing resources and a total power value of each processor core being minimum.

According to a third aspect of the disclosure, there is provided a non-transitory computer-readable storage medium storing a computer program which, when executed by a processor, cause the processor to carry out following actions: detecting a current processor load; determining required computing resources according to the current processor load, the required computing resources corresponding to a total frequency of each processor core; obtaining priori power values of each processor core at different frequencies; determining the number of processor cores and a frequency of each processor core according to the priori power values of each processor core at different frequencies, with a total frequency of each processor core satisfying the required computing resources and a total power value of each processor core being minimum.

BRIEF DESCRIPTION OF THE DRAWINGS

In order to illustrate technical solutions of implementations of the present disclosure more clearly, the drawings used in the implementations will be briefly described below. It will be apparent that the drawings described in the following are merely some implementations of the present disclosure, and it will be apparent to those skilled in the art that other drawings can be obtained from the drawings without any creative work.

DETAILED DESCRIPTION

Figure 1:
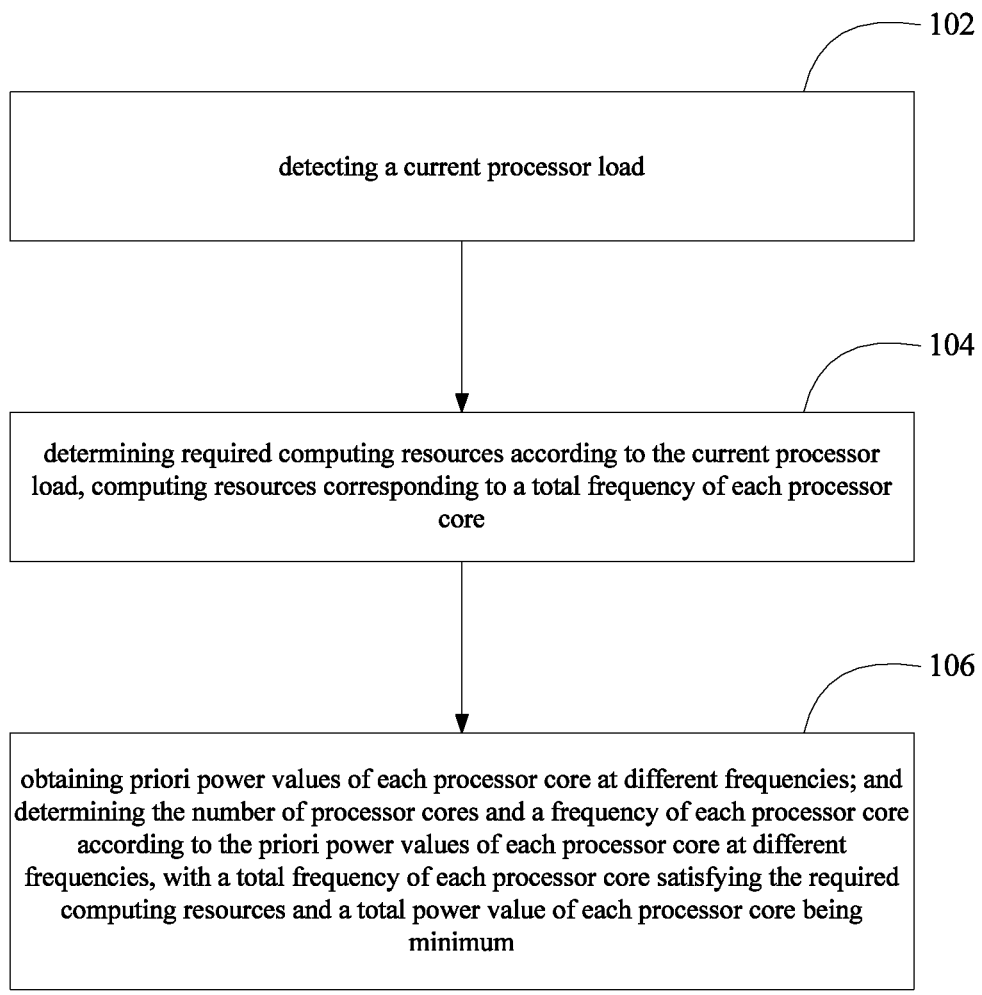
FIG. 1 is a schematic flow chart illustrating a method for allocating computing resources of a processor according to an implementation of the present disclosure.

Technical solutions of the present disclosure will be described clearly and completely with reference to the accompanying drawings; obviously, implementations described below are merely part of rather than all of the implementations of the present disclosure. Based on the implementations of the present disclosure, other implementations obtained there from without any creative work by those of ordinary skill in the art shall fall into the protection scope of the present disclosure.

It should be noted that, terms involved in the implementations of the present disclosure are only for the purpose of describing specific implementations, and are not intended to limit the present disclosure. Singular forms "a", "an", and "the" involved in the implementations of the present disclosure and appended claims are intended to include plural forms as well, unless a context clearly indicates other meanings. It should also be understood that, the term "and/or" involved herein refers to and includes any and all possible combinations of one or more of associated listed items.

A method for allocating computing resources of a processor is provided in the implementations of the present disclosure. An implementation of the method can depend on computer programs, which can run in a computer system based on a von Neumann system. The computer programs can be processor controlled application programs of a multi-core processor of a terminal. The computer system can be a terminal device where the above-mentioned computer programs running, such as a smart phone, a tablet personal computer, a personal computer, and the like.

The "terminal" involved in the implementations of the present disclosure can include a smart phone, a tablet personal computer, a vehicle terminal, a computer, and the like.

The "processor load" involved in the implementations of the present disclosure can refer to the number of processes that are currently processed and the number of processes to be processed by the processor.

The "computing resources" involved in the implementations of the present disclosure can refer to operating frequencies corresponding to processor cores.

The "foreground user operation" is relative to background user operation. The foreground user operation is for foreground applications. The foreground applications refer to applications which are operated currently. The background user applications refer to applications which are not operated currently but still running in background.

In practice, those skilled in the art find that an actual load of a processor is different in different application scenarios. For example, there may be a large load difference between different foreground applications. For example, playing music requires a very lightweight load, taking photos or web browsing requires a moderate load, large-scale games require a heavy load, and there is a large difference in the required number and frequency resources of central processing units (CPUs) or graphics processing units (GPUs). In addition, a large number of background applications are also running in the terminal, which also requires a certain amount of processor resources. In processor core control of an operating system, a frequency governor is responsible for frequency hopping and voltage regulation of a kernel, and a hot-plug control unit is responsible for switching of a plurality of processor cores. The frequency governor is usually a function module that runs periodically to predict a subsequent load based on a current operating frequency, load, and a direction of change of the processor load of currently running CPU/GPU. The frequency governor can determine an operating frequency of the CPU/GPU in a next cycle, to dynamically adjust the CPU/GPU operating frequency in real time. The processing method is mainly to preset load periodically based on current operating frequency and direction of change of the processor load (the "direction of change of the processor load" means the processor load is increasing or decreasing), or determine switching of each processor core according to the number of tasks running per unit time. That is, it is difficult for the frequency governor and the hot-plug control unit to distinguish different load requirements of foreground and background applications, and cannot control allocation of processor resources based on loads accurately.

That is to say, in control schemes of a multi-core processor in the related art, the processor cannot distinguish different load requirements of foreground and background applications, and cannot control the allocation of processor resources based on the load accurately. This can lead to the following problems, for example, processor overload, a phenomenon such as a stuck caused by insufficient processing ability of the processor, or some processor cores may run in a "idle" state due to processor under-load, which in turn leads to unnecessary power waste.

According to a first aspect of implementations of the present disclosure, there is provided a method for allocating computing resources of a processor. The method includes: detecting a current processor load; determining required computing resources according to the current processor load, the required computing resources corresponding to a total frequency of each processor core; obtaining priori power values of each processor core at different frequencies; determining the number of processor cores and a frequency of each processor core according to the priori power values of each processor core at different frequencies, with a total frequency of each processor core satisfying the required computing resources and a total power value of each processor core being minimum.

In an implementation, the detecting a current processor load includes: obtaining a processor load of each processor core in a current state; determining the current processor load according to the processor load of each processor core in the current state.

In an implementation, the obtaining priori power values of each processor core at different frequencies includes: determining a correspondence between operating frequencies and power values of each processor core, the power values being exponentially related to the operating frequencies; determining the power values of each processor core at different frequencies according to the correspondence.

In an implementation, the method further includes the follows after the detecting a current processor load: determining the minimum number of required processor cores according to the current processor load; determining the maximum number of processor cores in a system; determining a selectable range of the number of processor cores according to the minimum number and the maximum number of processor cores; determining a plurality of frequency allocation strategies according to a formula $N_{c\_x}*F_x=N_{c\_min}*F_{max}$; the value of $N_{c\_x}$ being in [$N_{c\_min}$, $N_{c\_max}$], $N_{c\_min}$ referring to the minimum number of required processor cores, $N_{c\_max}$ referring to the maximum number of processor cores in the system, $F_{max}$ referring to the maximum frequency of a single processor core, and $F_x$ referring to a frequency allocated to a processor core; the determining the number of processor cores and a frequency of each processor core according to the priori power values of each processor core at different frequencies includes: determining a frequency allocation strategy according to the priori power values of each processor core at different frequencies, with the total power value of each processor core corresponding to the frequency allocation strategy determined being minimum.

In an implementation, the determining the minimum number of required processor cores according to the current processor load includes: determining the minimum number of required processor cores according to a formula $N_{c\_min}=[(L_c+100)/100]$, $L_c$ referring to the current processor load.

In an implementation, the method further includes the follows after the detecting a current processor load: setting the current processor load to a single processor core, when the minimum number of required processor cores determined according to the current processor load is one and there is no foreground user operation.

In an implementation, the method further includes the follows after the determining the number of processor cores and a frequency of each processor core according to the priori power values of each processor core at different frequencies: applying configurations of the number of processor cores and the frequency of each processor core to the processor cores by calling interfaces of a frequency governor and a hot-plug unit.

In an implementation, the processor cores include a central processing unit (CPU) core and a graphics processing unit (GPU) core.

According to a second aspect of the implementations of the present disclosure, there is provided a terminal device which includes at least one processor and a computer readable storage coupled to the at least one processor. The computer readable storage stores at least one computer executable instruction thereon, which when executed by the at least one processor, cause the at least one processor to carry out actions, including: detecting a current processor load; determining required computing resources according to the current processor load, the required computing resources corresponding to a total frequency of each processor core; obtaining priori power values of each processor core at different frequencies; determining the number of processor cores and a frequency of each processor core according to the priori power values of each processor core at different frequencies, with a total frequency of each processor core satisfying the required computing resources and a total power value of each processor core being minimum.

In an implementation, the at least one processor carrying out the action of detecting the current processor load is caused to carry out actions, including: obtaining a processor load of each processor core in a current state; determining the current processor load according to the processor load of each processor core in the current state.

In an implementation, the at least one processor carrying out the action of obtaining priori power values of each processor core at different frequencies, including: determining a correspondence between operating frequencies and power values of each processor core, the power values being exponentially related to the operating frequencies; determining the power values of each processor core at different frequencies according to the correspondence.

In an implementation, the at least one processor is further caused to carry out actions, including: determining the minimum number of required processor cores according to the current processor load; determining the maximum number of processor cores in a system; determining a selectable range of the number of processor cores according to the minimum number and the maximum number of processor cores; determining a plurality of frequency allocation strategies according to a formula $N_{c\_x}*F_x=N_{c\_min}*F_{max}$; the value of $N_{c\_x}$ being in $[N_{c\_min}, N_{c\_max}]$, $N_{c\_min}$ referring to the minimum number of required processor cores, $N_{c\_max}$ referring to the maximum number of processor cores in the system, $F_{max}$ referring to the maximum frequency of a single processor core, and $F_x$ referring to a frequency allocated to a processor core; the at least one processor carrying out the action of determining the number of processor cores and the frequency of each processor core according to the priori power value of each processor core at different frequencies is caused to carry out actions, including: determining a frequency allocation strategy according to the priori power values of each processor core at different frequencies, with the total power value of each processor core corresponding to the frequency allocation strategy determined being minimum.

In an implementation, the at least one processor carrying out the action of determining the minimum number of required processor cores according to the current processor load is caused to carry out actions, including: determining the minimum number of required processor cores according to a formula $N_{c\_min}=[(L_c+100)/100]$, $L_c$ referring to the current processor load.

In an implementation, the at least one processor is further caused to carry out actions, including: setting the current processor load to a single processor core, when the minimum number of required processor cores determined according to the current processor load is one and there is no foreground user operation.

In an implementation, the at least one processor is further caused to carry out actions, including: applying configurations of the number of processor cores and the frequency of each processor core to the processor cores by calling interfaces of a frequency governor and a hot-plug unit.

In an implementation, the processor cores comprise a central processing unit (CPU) core and a graphics processing unit (GPU) core.

According to a third aspect of the implementations of the present disclosure, there is provided a non-transitory computer-readable storage medium storing a computer program which, when executed by a processor, causes the processor to carry out actions: detecting a current processor load; determining required computing resources according to the current processor load, the required computing resources corresponding to a total frequency of each processor core; obtaining priori power values of each processor core at different frequencies; determining the number of processor cores and a frequency of each processor core according to the priori power values of each processor core at different frequencies, with a total frequency of each processor core satisfying the required computing resources and a total power value of each processor core being minimum.

In an implementation, the computer program executed by the processor to carry out the action of detecting the current processor load is executed by the processor to carry out actions, including: obtaining a processor load of each processor core in a current state; determining the current processor load according to the processor load of each processor core in the current state.

In an implementation, the computer program executed by the processor to carry out the action of obtaining the priori power values of each processor core at different frequencies is executed by the processor to carry out actions, including: determining a correspondence between operating frequencies and power values of each processor core, the power values being exponentially related to the operating frequencies; determining the power values of each processor core at different frequencies according to the correspondence.

In an implementation, the computer program is further executed by the processor to carry out actions: determining the minimum number of required processor cores according to the current processor load; determining the maximum number of processor cores in a system; determining a selectable range of the number of processor cores according to the minimum number and the maximum number of processor cores; determining a plurality of frequency allocation strategies according to a formula $N_{c\_x}*F_x=N_{c\_min}*F_{max}$; the value of $N_{c\_x}$ being in $[N_{c\_min}, N_{c\_max}]$, $N_{c\_min}$ referring to the minimum number of required processor cores, $N_{c\_max}$ referring to the maximum number of processor cores in the system, $F_{max}$ referring to the maximum frequency of a single processor core, and $F_x$ referring to a frequency allocated to a processor core; the computer program executed by the processor to carry out the action of obtaining the priori power values of each processor core at different frequencies is executed by the processor to carry out actions, including: determining a frequency allocation strategy according to the priori power values of each processor core at different frequencies, with the total power value of each processor core corresponding to the frequency allocation strategy determined being minimum.

By means of the method and the apparatus for allocating computing resources of a processor, and the terminal, the number and frequencies of operating processor cores are optimized in a range of processor resources allowed by a system according to a current processor load condition of the terminal and minimum computing resources currently required. That is, according to different power consumption parameters corresponding to different combinations of the number and the frequencies of processor cores, an optimal power consumption result can be obtained under the premise that a performance requirement is met. That is, the number and the frequencies of operating processors cores are determined. By means of the method and the apparatus for allocating computing resources of a processor, the power consumption of the terminal can be reduced under the premise of ensuring performance of a display thread.

In order to reduce unnecessary power consumption of the processor, as illustrated in FIG. 1, the method for allocating computing resources of a processor can include operations at blocks 102 to 108.

At block 102, a current processor load(s) is detected.

In implementations of the present disclosure, the processor involved can be a central processing unit (CPU), a graphics processing unit (GPU), a micro controller unit (MCU), or any combination thereof. Moreover, the processor involved in the implementations can be a symmetrical multi-core processor or an asymmetric multi-core processor.

The processor load depends on the number of processes that are currently processed and the number of processes to be processed by the processor. Generally speaking, the larger the load, the more processing resources are occupied in the processor, that is, the smaller remaining processing ability. In this implementation, for a plurality of cores of the processor in the terminal, a processor load of each processor core in a current state is obtained respectively.

At block 104, required computing resources are determined according to the current processor load. The required "computing resources" correspond to a total frequency of each operating processor core.

The computing resources refer to operating frequencies corresponding to processor cores. Threshold computing resources of a processor core can represent the largest operating frequency at which the processor core operates. In order to support the current processor load, that is, the number of processes and task amount that are processed currently and to be processed by the processor, the operating frequencies of the processor cores need to be ensured.

In this implementation of the present disclosure, an operating frequency corresponding to each processor load can be determined correspondingly, and then the total operating frequency corresponding to a total processor load can be calculated. The total operating frequency can refer to a sum of operating frequencies of the processor cores with processor loads. The total operating frequency can refer to computing resources required by all processor loads (in other words, the total processor load), that is, computing resources required to be allocated to the terminal by the processor cores for processing current process or tasks of the terminal.

At block 106, priori power values of each processor core at different frequencies are obtained, the number of processor cores and a frequency of each processor core are determined according to the priori power values, with a total frequency of each processor core satisfying the required computing resources and a total power value of each processor core being minimum.

In the implementations, power values of each processor core at different operating frequencies need to be obtained in advance, that is, a correspondence between operating frequencies and power values of each processor core needs to be determined. Herein, the "each processor core" can be any one processor core of the processor. In this implementation, the correspondence can be provided by processor manufactures, or can be experimental results obtained by the terminal in advance. Generally speaking, the operating frequency of the processor core is not proportional to the power value; instead, the operating frequency is exponentially related to the power value. That is, the power value increases exponentially with the increase of the operating frequency.

After obtaining the correspondence between operating frequencies and power values of each processor core, the number of processor cores and the frequency of each operating processor core can be determined according to the correspondence. For example, we suppose computing resources corresponding to a processor load is 4G, the number of available processor cores is four, and the maximum calculation amount of each processor core is 4G, then for the above-identified requirement of 4G computing resources, four kinds of combinations of processor cores are listed in the following.

1. A single processor core operates at an operating frequency of 4G.
2. Two processor cores operate at an operating frequency of 2G respectively.
3. Three processor cores operate at an operating frequency of 4/3G respectively.
4. Four processor cores operate at an operating frequency of 1G respectively.

All of the above-mentioned four kinds of combinations of the operating number and operating frequency of processor cores can satisfy the current load of the terminal, that is, an overall processing ability of the processor is sufficient. As for the above-mentioned various combination mode, which one is selected depends on a specific power consumption of a combination. The total power value of each processor core of the combination mode selected will be minimum. That is, the number and the operating frequencies of processor cores selected are capable of resulting a minimum a power consumption of the processor.

It should be noted that, in this implementation, the operating frequency of each processor core selected can be same or different from each other.

For example, for the above-identified requirement of 4G computing resources, there are also various combinations of processor cores listed in the following, where the operating frequency of each processor core selected is different from each other.

1. There can be two processor cores selected, one processor core operates at an operating frequency of 1G, and the other operates at an operating frequency of 3G.
2. There can be three processor cores selected, the first and second processor core operates at an operating frequency of 1G, and the third operates at an operating frequency of 2G respectively.

There are also many combinations of processor cores, which is not limited herein.

After the current processor load is detected, the following operations can be conducted. The minimum number of required processor cores is determined according to the current processor load. The maximum number of processor cores in a system is determined. A selectable range of the number of processor cores is determined according to the minimum number and the maximum number of processor cores. A plurality of frequency allocation strategies is determined according to a formula $N_{c\_x} * F_x = N_{c\_min} * F_{max}$.

The value of $N_{c\_x}$ is in $[N_{c\_min}, N_{c\_max}]$ ($[N_{c\_min}, N_{c\_max}]$ means integers from $N_{c\_min}$ to $N_{c\_max}$, including $N_{c\_min}$ and $N_{c\_max}$), $N_{c\_min}$ refers to the minimum number of required processor cores, $N_{c\_max}$ refers to the maximum number of processor cores in the system, $F_{max}$ refers to the maximum frequency of a single processor core, and $F_x$ refers to a frequency allocated to a processor core.

For the formula $N_{c\_x}*F_x=N_{c\_min}$ max, the operating frequency of each processor core selected can be same.

The number of processor cores and the frequency of each processor core can be determined according to the priori power values of each processor core at different frequencies as follows. A frequency allocation strategy is determined according to the priori power values of each processor core at different frequencies, where the total power value of each processor core corresponding to the frequency allocation strategy determined is minimum.

$L_c$ refers to the current processor load and the minimum number of required processor cores corresponding to the load can be determined with the following formula: $N_{c\_min}=[(L_c+100)/100]$.

For example, when $L_c=20\%$ (that means twenty percent of the processing resources of the processor is occupied, or the remaining processing ability of the processor is 80%), the minimum number of required processor cores is one; when $L_c=120\%$, the minimum number of required processor cores is two.

The total number of processor cores in the terminal refers to the maximum number of allowable or available processor cores in the terminal, which is represented by $N_{c\_max}$ in this implementation. For example, as for a CPU with four cores, $N_{c\_max}=4$; as for a CPU with eight cores, $N_{c\_max}=8$.

The number of processor cores that can be selected for operation can be determined according to the minimum number $N_{c\_min}$ of required processor cores and the maximum number $N_{c\_max}$ of processor cores in the system. For example, when $N_{c\_min}=1$ and $N_{c\_max}=8$, the number $N_{c\_x}$ of processor cores that can be selected for operation can be 1, 2, 3, 4, 5, 6, 7, and 8, which are integers in the range [1, 8]. The value of $N_{c\_x}$ ranges from $N_{c\_min}$ to $N_{c\_max}$ (that is, $[N_{c\_min}, N_{c\_max}]$).

$N_{c\_min}$ can be determined according to the specific value of computing resources calculated via the operations at block 104 and the largest frequency corresponding to each processor core. Various frequency allocation strategies can be determined according to the formula $N_{c\_x}*F_x=N_{c\_min}*F_{max}$. $F_{max}$ refers to the maximum frequency of a single processor core and $F_x$ refers to a frequency allocated to a processor core. Different combinations of numbers and operating frequencies of the processor cores can be determined based on the values of $N_{c\_x}$ and $F_x$.

In the process of determining the number of processor cores and the frequency of each processor core according to the priori power values of each processor core at different frequencies, a frequency allocation strategy that satisfies the above-mentioned computing resources can be determined according to the priori power values of each processor core at different frequencies, that is, according to a correspondence between different operating frequencies and power values of each processor core. In other words, a total operating frequency allocated to the processor cores satisfies the specific value of the computing resources obtained via the operations at block 104. Based on this, a frequency allocation strategy with a minimum total power value will be selected. For example, a total power value under each frequency allocation strategy can be calculated, the minimum value of total power values can be determined according to the calculated total power values, and a frequency allocation strategy corresponding to the minimum value is selected. The number and frequency of running processor cores of the frequency allocation strategy thus obtained can be a frequency allocation strategy with the lowest power consumption level under the premise of satisfying the current load requirement of the system.

In another implementation, the method can further include the follows after the current processor load is detected. The current processor load is set to a single processor core, when the minimum number of required processor cores determined according to the current processor load is one and there is no foreground user operation.

In general, standby current in a single-core processor mode are less than that in a dual-core or multi-core processor mode, so the terminal load can be set to a single processor core where circumstances permit. Specifically, when the determined $N_{c\_min}=1$, it means that a single processor core is sufficient to carry the current load. In addition, when a user does not perform any foreground operation at present, it indicates that the user does not have a large load requirement on the terminal, therefore, the entire current processor load can be carried out by a single processor, that is, the terminal can be turned into a single processor core mode. For example, when the processor is a CPU, the terminal entered a single CPU core mode. By means of the implementation, the standby current of the terminal can be significantly reduced.

In this implementation, the number and the frequencies of operating processor cores in the processor are determined according to the foregoing operations, and then the terminal needs to set the processor thereof according to the determined number and frequencies of operating processor cores in the processor. In this implementation, in processor core control of an operating system, a frequency governor is responsible for frequency hopping and voltage regulation of a kernel, and a CPU/GPU hot-plug control unit is responsible for switching of a plurality of processing cores. That is, switching of the processor cores and frequency adjustment are completed through the frequency governor and the hot-plug control unit. In an implementation, the method can further include the follows after the number of processor cores and the frequency of each processor core are determined according to the priori power values of each processor core at different frequencies. Configurations of the number of processor cores and the frequency of each processor core are applied to processor cores by calling interfaces of the frequency governor and the hot-plug unit.

Figure 2:
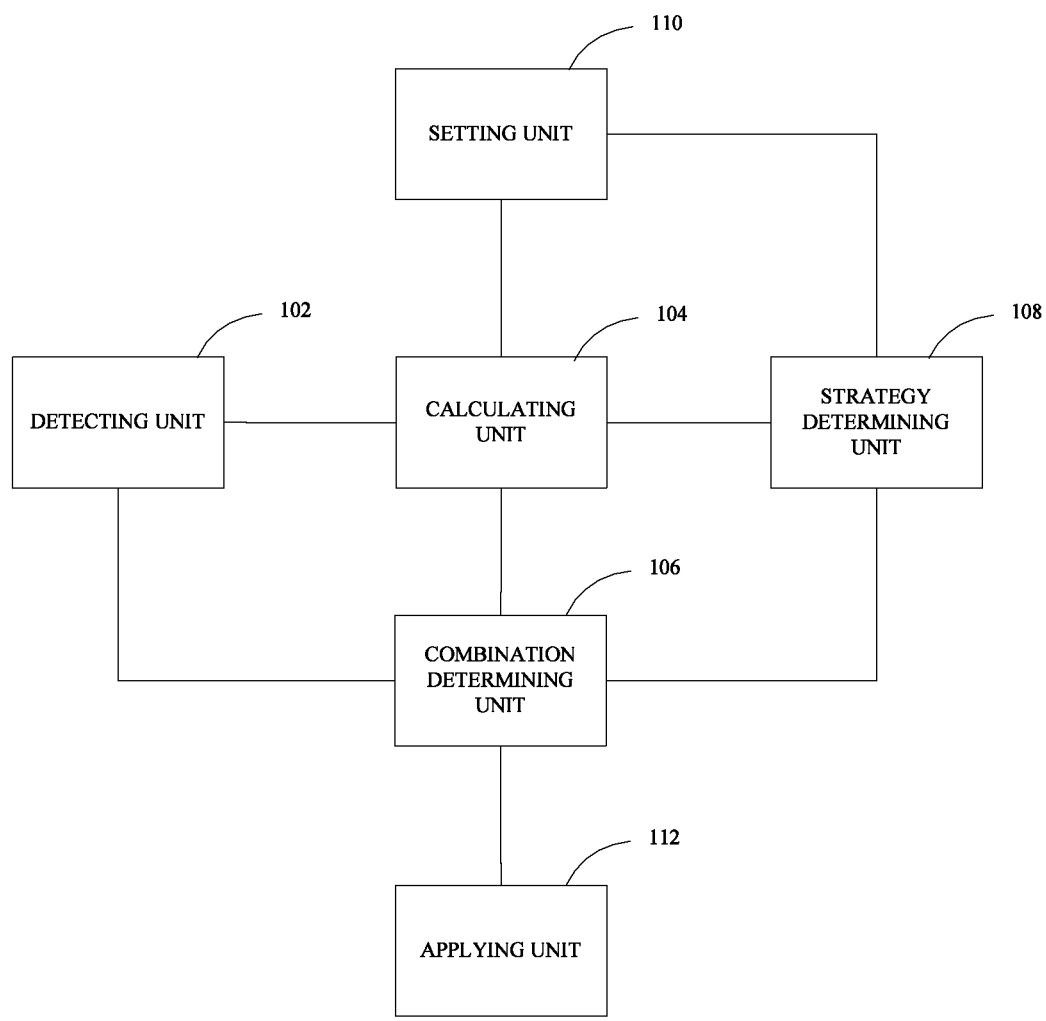
FIG. 2 is a schematic structural diagram illustrating an apparatus for allocating computing resources of a processor according to an implementation of the present disclosure.

In one implementation, as illustrated in FIG. 2, an apparatus for allocating computing resources of a processor is also provided. The apparatus for allocating computing resources of a processor includes a detecting unit 102, a calculating unit 104, and a combination determining unit 106.

The detecting unit 102 is configured to detect a current processor load.

In implementations of the present disclosure, the processor involved can be a central processing unit (CPU), a graphics processing unit (GPU), a micro controller unit (MCU), or any combination thereof. Moreover, the processor involved in the implementations can be a symmetrical multi-core processor or an asymmetric multi-core processor.

The processor load depends on the number of processes that are currently processed and the number of processes to be processed by the processor. Generally speaking, the larger the load, the more processing resources are occupied in the processor, that is, the smaller remaining processing ability. In this implementation, for a plurality of cores of the processor in the terminal, the detecting unit 102 obtains a processor load of each processor core in a current state respectively.

The calculating unit 104 is configured to determine required computing resources according to the current processor load. The required "computing resources" correspond to a total frequency of each processor core.

The computing resources refer to operating frequencies corresponding to processor cores, Threshold computing resources of a processor core can represent the largest operating frequency at which the processor core operates. In order to support the current processor load, that is, the number of processes and task amount that are processed currently and to be processed by the processor, the operating frequencies of the processor cores need to be ensured.

In the implementations of the present disclosure, the calculating unit 104 determines an operating frequency corresponding to each processor load correspondingly, and then calculate a total operating frequency corresponding to a total processor load. The total operating frequency can refer to computing resources required by all processor loads (in other words, the total processor load), that is, computing resources required to be allocated to the terminal by the processor cores for processing current process or tasks of the terminal.

The combination determining unit 106 is configured to determine the number of processor cores and a frequency of each processor core according to the priori power values of each processor core at different frequencies, with a total frequency of each processor core conforms to (in other words, satisfying) the computing resources and a total power value of each processor core is minimum.

In the implementations, the combination determining unit 106 needs to obtain power values of each processor core at different operating frequencies in advance, that is, the combination determining unit 106 determines a correspondence between operating frequencies and power values of each processor core. In this implementation, the correspondence can be provided by processor manufactures, or can be experimental results obtained by the terminal in advance. Generally speaking, the operating frequency of the processor core is not proportional to the power value; instead, the operating frequency is exponentially related to the power value. That is, the power value increases exponentially with the increase of the operating frequency.

After obtaining the correspondence between operating frequencies and power values of each processor, the combination determining unit 106 can determine the number of processor cores and the frequency of each processor core according to the correspondence. For example, we suppose computing resources corresponding to a processor load is 4G, the number of available processor cores is four, and the maximum calculation amount of each processor core is 4G, then for the above-identified requirement of 4G computing resources, four kinds of combinations of processor cores are listed in the following.

1. a single processor core operates at an operating frequency of 4G.
2. two processor cores operate at an operating frequency of 2G respectively.
3. three processor cores operate at an operating frequency of 4/3G respectively.
4. four processor cores operate at an operating frequency of 1G respectively.

All of the above-mentioned four kinds of combinations of the operating numbers and operating frequencies of processor cores can satisfy the current load of the terminal, that is, an overall processing ability of the processor is sufficient. As for the above-mentioned various combinations mode, which one is selected depends on a specific power consumption of a combination. The total power value of each processor core of the combination mode selected will be minimum. That is, the number and the operating frequencies of processor cores selected are capable of resulting a minimum power consumption of the processor.

It should be noted that, in this implementation, the operating frequency of each processor core can be same or different from each other.

In an implementation, as illustrated in FIG. 2, the apparatus can further include a strategy determining unit 108. The strategy determining unit 108 is configured to: determine the minimum number of required processor cores according to the current processor load; determine the maximum number of processor cores in a system; determine a selectable range of the number of processor cores according to the minimum number and the maximum number of processor cores; determine a plurality of frequency allocation strategies according to a formula $N_{c\_x}*F_x=N_{c\_min}*F_{max}$. The value of $N_{c\_x}$ is in $[N_{c\_min}, N_{c\_max}]$ ($[N_{c\_min}, N_{c\_max}]$ means integers from $N_{c\_min}$ to $N_{c\_max}$, including $N_{c\_min}$ and $N_{c\_max}$), $N_{c\_min}$ refers to the minimum number of required processor cores, $N_{c\_max}$ refers to the maximum number of processor cores in the system, $F_{max}$ refers to the maximum frequency of a single processor core, and $F_x$ refers to a frequency allocated to a processor core.

The combination determining unit 106 is configured to determine a frequency allocation strategy according to the priori power values of each processor core at different frequencies. The total power value of each processor core corresponding to the frequency allocation strategy determined is minimum.

$L_c$ refers to the current processor load and the minimum number of required processor cores corresponding to the load can be determined with the following formula: $N_{c\_min}=[(L_c+100)/100]$.

For example, when $L_c=20\%$, the minimum number of required processor cores is one; when $L_c=120\%$, the minimum number of required processor cores is two.

The total number of processor cores in the terminal refers to the maximum number of allowable or available processor cores in the terminal, which is represented by $N_{c\_max}$ in this implementation. For example, as for a CPU with four cores, $N_{c\_max}$ four; as for a CPU with eight cores, $N_{c\_max}=$eight.

The strategy determining unit 108 can determine the number of processor cores which can be selected for operation according to the minimum number $N_{c\_min}$ of required processor cores and the maximum number $N_{c\_max}$ of processor cores in the system. For example, when $N_{c\_min}=1$ and $N_{c\_max}=8$, the number $N_{c\_x}$ of processor cores which can be selected for operation can be 1, 2, 3, 4, 5, 6, 7, and 8, which are integers in the range [1, 8]. The value of $N_{c\_x}$ ranges from $N_{c\_min}$ to $N_{c\_max}$ (that is, $[N_{c\_min}, N_{c\_max}]$).

The strategy determining unit 108 can determine $N_{c\_min}$ according to the specific value of computing resources calculated by the calculating unit 104 and the largest frequency corresponding to each processor core. Various frequency allocation strategies can be determined according to the formula $N_{c\_x}*F_x=N_{c\_min}*F_{max}$. $F_{max}$ refers to the maximum frequency of a single processor core and $F_x$ refers to a frequency allocated to a processor core. Different combinations of numbers and operating frequencies of the processor cores can be determined based on the values of $N_{c\_x}$ and $F_x$.

In the process of the strategy determining unit 108 determining the number of processor cores and the frequency of each processor core according to the priori power values of each processor core at different frequencies, a frequency allocation strategy that satisfies the above-mentioned computing resources can be determined according to the priori power values of each processor core at different frequencies, that is, according to a correspondence between different operating frequencies and power values of each processor core. In other words, a total operating frequency allocated to the processor cores satisfies the specific value of the above obtained computing resources. Based on this, a frequency allocation strategy with a minimum total power value will be selected. For example, the strategy determining unit 108 can calculate a total power value under each frequency allocation strategy, determine the minimum value of total power values according to the calculated total power values, and select a frequency allocation strategy corresponding to the minimum value. The number and the frequency of operating processor cores of the frequency allocation strategy thus obtained can be a frequency allocation strategy with the lowest power consumption level under the premise of satisfying the current load requirement of the system.

In another implementation, the apparatus can further include a setting unit 110. The setting unit 110 is configured to set the current processor load to a single processor core, when the minimum number of required processor cores determined according to the current processor load is one and there is no foreground user operation.

In general, standby current in a single-core processor mode are less than that in a dual-core or multi-core processor mode, so the setting unit 110 can set the terminal load to a single processor core where circumstances permit. Specifically, when the determined $N_{c\_min}=1$, it means that a single processor core is sufficient to carry the current load. In addition, when a user does not perform any foreground operation at present, it indicates that the user does not have a large load requirement on the terminal, therefore, the setting unit 110 can set the entire current processor load to a single processor to be carried out, that is, the terminal can be turned into a single processor core mode. For example, when the processor is a CPU, the terminal entered a single CPU core mode. By means of the implementation, the standby current of the terminal can be significantly reduced.

In another implementation, as illustrated in FIG. 2, the apparatus can further include an applying unit 112. The applying unit 112 is configured to apply configurations of the number of processor cores and the frequency of each processor core to processor cores by calling interfaces of a frequency governor and a hot-plug unit.

In this implementation, the applying unit 112 needs to set the processor of the terminal according to the determined number and frequencies of operating processor cores in the processor. In this implementation, in processor core control of an operating system, a frequency governor is responsible for frequency hopping and voltage regulation of a kernel, and a CPU/GPU hot-plug control unit is responsible for switching of a plurality of processing cores. That is, switching of the processor cores and frequency adjustment are completed through the frequency governor and the hot-plug control unit. In an implementation, the method can further include the follows after the number of processor cores and the frequency of each processor core are determined according to the priori power values of each processor core at different frequencies. Configurations of the number of processor cores and the frequency of each processor core are applied to processor cores by calling interfaces of the frequency governor and the hot-plug unit.

By means of the implementations of the present disclosure, there are the following beneficial effects.

By means of the method and the apparatus for allocating computing resources of a processor, the number and frequencies of operating processor cores are optimized in a range of processor resources allowed by a system according to a current processor load condition of the terminal and minimum computing resources currently required. That is, according to different power consumption parameters corresponding to different combinations of the number and the frequencies of processor cores, an optimal power consumption result can be obtained under the premise that a performance requirement is met. That is, the number and the frequencies of operating processors cores are determined. By means of the method and the apparatus for allocating computing resources of a processor, the power consumption of the terminal can be reduced under the premise of ensuring performance of a display thread.

The above units can be realized through one or more processors, for example, the above units can be integrated in one processor, or, can be distributed among different processors.

Figure 3:
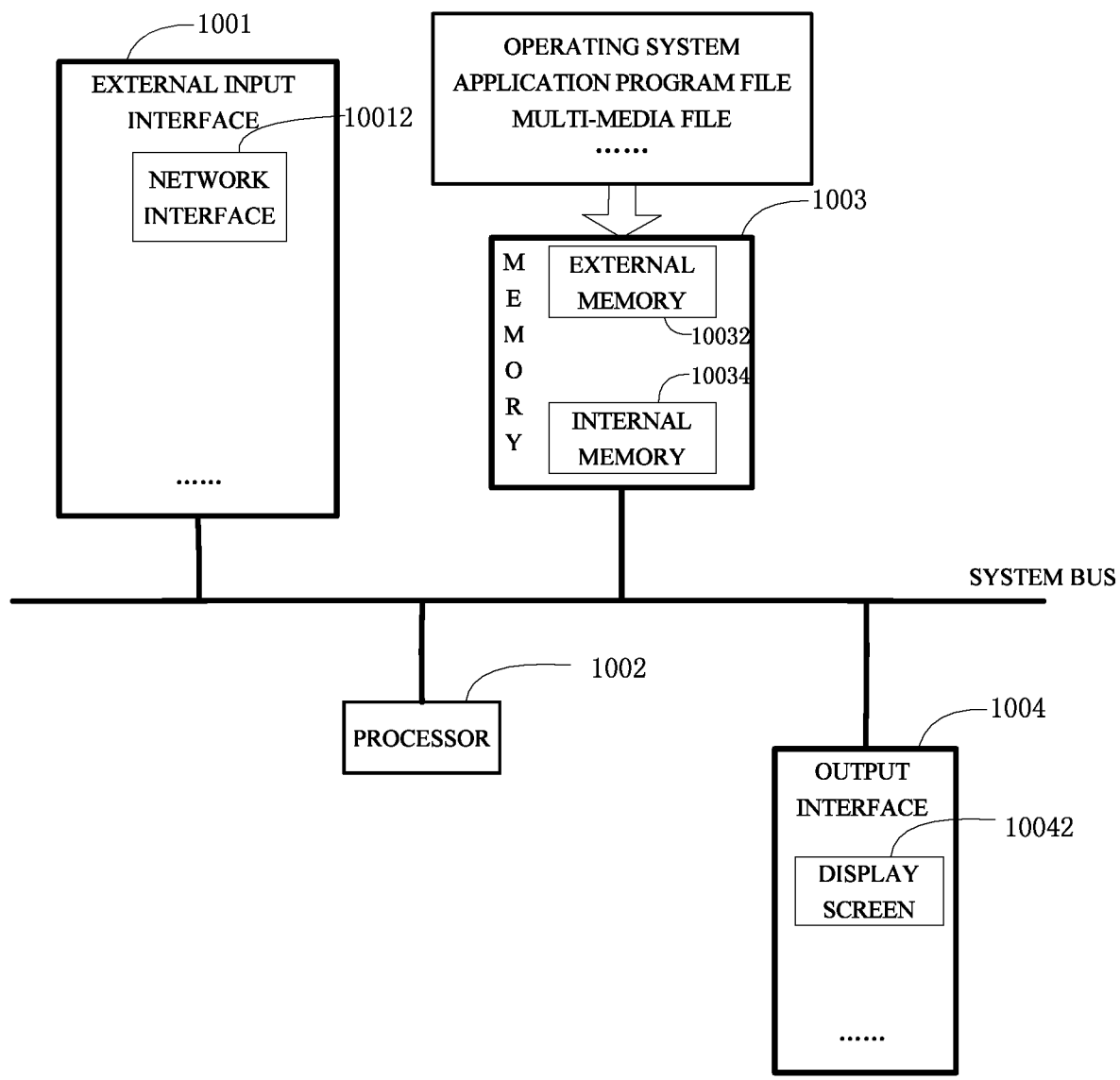
FIG. 3 is a schematic structural diagram illustrating a computer device for executing the method for allocating computing resources of a processor according to an implementation of the present disclosure.

In one implementation, as illustrated in FIG. 3, FIG. 3 illustrates a terminal based on a von Neumann system computer system that executes the above-described method for allocating computing resources of a processor. The computer system can be a terminal device such as a smart phone, a tablet computer, a palm computer, a laptop computer, or a personal computer. Specifically, the terminal can include an external input interface 1001, a processor 1002, a memory 1003, and an output interface 1004. The external input interface 1001, the processor 1002, the memory 1003, and the output interface 1004 can be connected through a system bus. In one implementation, the external input interface 1001 can include at least a network interface 10012. The memory 1003 can include an external memory 10032 (such as a hard disk, an optical disk, or a floppy disk, etc.) and an internal memory 10034. The output interface 1004 can include at least a device such as a display screen 10042.

In this implementation, the operation of the method is based on computer programs. Program file of the computer programs is stored in the external memory 10032 of the aforementioned computer system based on the von Neumann system, loaded into the internal memory 10034 when executed, and then passed to the processor 1002 for execution after being compiled into machine code, so that a detecting unit 102, a calculating unit 104, and a combination determining unit 106 can be formed logically in the computer system based on the von Neumann system. In the execution process of the method for allocating computing resources of a processor, input parameters are all received through the external input interface 1001, transferred to the memory 1003 to be buffered, and then input to the processor 1002 to be processed. The processed result data can be buffered in the memory 1003 for subsequent processing or can be passed to the output interface 1004 for output.

The implementations of the present disclosure also provide a non-transitory computer-readable storage medium. The non-transitory computer-readable storage medium stores computer programs which, when executed by a processor, causes the processor to carry out all or part of the actions of any method for allocating computing resources of a processor based on a processor load described in the above-described method implementations.

The implementations of the present disclosure also provide a computer program product. The computer program product includes a non-transitory computer readable storage medium for storing computer programs. The computer programs, when executed, are operable with a computer to perform all or part of operations of any method according to the second aspect of the implementations of the present disclosure. The computer program product can be a software installation package.

The above disclosed implementations are merely exemplary implementations of the present disclosure and the scope of the present disclosure is not limited thereto. Therefore, equivalent changes made according to the claims of the present disclosure shall still fall within the scope of the present disclosure.

What is claimed is:

1. A method for allocating computing resources of a processor based on a processor load, comprising:
   detecting a current processor load;
   determining the minimum number of required processor cores according to the current processor load;
   determining the maximum number of processor cores in a system;
   determining a selectable range of the number of processor cores according to the minimum number and the maximum number of processor cores;
   determining a plurality of frequency allocation strategies according to a formula $N_{c\_x}*F_x=N_{c\_min}*F_{max}$,
   wherein the value of $N_{c\_x}$ is in $[N_{c\_min}, N_{c\_max}]$, $N_{c\_min}$ is the minimum number of required processor cores, $N_{c\_max}$ is the maximum number of processor cores in the system, $F_{max}$ is the maximum frequency of a single processor core, and $F_x$ is a frequency allocated to a processor core;
   determining required computing resources according to the current processor load, the required computing resources corresponding to a total frequency of each processor core;
   obtaining priori power values of each processor core at different frequencies;
   determining the number of processor cores and a frequency of each processor core according to the priori power values of each processor core at different frequencies, with a total frequency of each processor core satisfying the required computing resources and a total power value of each processor core being minimum; and
   applying configurations of the number of processor cores and the frequency of each processor core to the processor cores by calling interfaces of a frequency governor and a hot-plug unit;
   wherein the determining the number of the processor cores and the frequency of each processor core according to the priori power values of each processor core at the different frequencies comprises:
   determining a frequency allocation strategy according to the priori power values of each processor core at different frequencies, with the total power value of each processor core corresponding to the frequency allocation strategy determined being minimum.

2. The method of claim 1, wherein detecting the current processor load comprises:
   obtaining a processor load of each processor core in a current state; and
   determining the current processor load according to the processor load of each processor core in the current state.

3. The method of claim 1, wherein obtaining the priori power values of each processor core at the different frequencies comprises:
   determining a correspondence between operating frequencies and power values of each processor core, the power values being exponentially related to the operating frequencies; and
   determining the power values of each processor core at different frequencies according to the correspondence.

4. The method of claim 1, wherein determining the minimum number of the required processor cores according to the current processor load comprises:
   determining the minimum number of required processor cores according to a formula $N_{c\_min}=[(L_c+100)/100]$, wherein $L_c$ is the current processor load.

5. The method of claim 1, further comprising:
   after detecting the current processor load, setting the current processor load to a single processor core, when the minimum number of required processor cores determined according to the current processor load is one and there is no foreground user operation.

6. The method of claim 1, wherein the processor cores comprise a central processing unit (CPU) core and a graphics processing unit (GPU) core.

7. A terminal device, comprising:
   at least one processor; and
   a computer readable storage, coupled to the at least one processor and storing at least one computer executable instruction thereon, which when executed by the at least one processor, cause the at least one processor to:
   detect a current processor load;
   determine the minimum number of required processor cores according to the current processor load;
   determine the maximum number of processor cores in a system;
   determine a selectable range of the number of processor cores according to the minimum number and the maximum number of processor cores; and
   determine a plurality of frequency allocation strategies according to a formula $N_{c\_x}*F_x=N_{c\_min}*F_{max}$,
   wherein the value of $N_{c\_x}$ is in $[N_{c\_min}, N_{c\_max}]$, $N_{c\_min}$ is the minimum number of required processor cores, $N_{c\_max}$ is the maximum number of processor cores in the system, $F_{max}$ is the maximum frequency of a single processor core, and $F_x$ is a frequency allocated to a processor core;
   determine required computing resources according to the current processor load, the required computing resources corresponding to a total frequency of each processor core;
   obtain priori power values of each processor core at different frequencies;
   determine the number of processor cores and a frequency of each processor core according to the priori power values of each processor core at different frequencies, with a total frequency of each processor core satisfying the required computing resources and a total power value of each processor core being minimum;
   apply configurations of the number of processor cores and the frequency of each processor core to the processor cores by calling interfaces of a frequency governor and a hot-plug unit;
   wherein the at least one processor caused to determine the number of processor cores and the frequency of each processor core according to the priori power value of each processor core at the different frequencies is further caused to:
  determine a frequency allocation strategy according to the priori power values of each processor core at different frequencies, with the total power value of each processor core corresponding to the frequency allocation strategy determined being minimum.

8. The terminal device of claim 7, the at least one processor to detect the current processor load is further caused to:
  obtain a processor load of each processor core in a current state; and
  determine the current processor load according to the processor load of each processor core in the current state.

9. The terminal device of claim 7, wherein the at least one processor to obtain the priori power values of each processor core at the different frequencies is further caused to:
  determine a correspondence between operating frequencies and power values of each processor core, the power values being exponentially related to the operating frequencies; and
  determine the power values of each processor core at different frequencies according to the correspondence.

10. The terminal device of claim 7, wherein the at least one processor caused to determine the minimum number of required processor cores according to the current processor load is further caused to:
  determine the minimum number of required processor cores according to a formula $N_{c\_min}=[(L_c+100)/100]$, wherein $L_c$ is the current processor load.

11. The terminal device of claim 7, wherein the at least one processor is further caused to
  set the current processor load to a single processor core, when the minimum number of required processor cores determined according to the current processor load is one and there is no foreground user operation.

12. The terminal device of any of claim 7, wherein the processor cores comprise a central processing unit (CPU) core and a graphics processing unit (GPU) core.

13. A non-transitory computer-readable storage medium storing a computer program which, when executed by a processor, causes the processor to:
  detect a current processor load;
    determine the minimum number of required processor cores according to the current processor load;
    determine the maximum number of processor cores in a system;
    determine a selectable range of the number of processor cores according to the minimum number and the maximum number of processor cores; and
    determine a plurality of frequency allocation strategies according to a formula $N_{c\_x}*F_x=N_{c\_min}*F_{max}$,
    wherein the value of $N_{c\_x}$ is in $[N_{c\_min}, N_{c\_max}]$, $N_{c\_min}$ is the minimum number of required processor cores, $N_{c\_max}$ is the maximum number of processor cores in the system, $F_{max}$ is the maximum frequency of a single processor core, and $F_x$ is a frequency allocated to a processor core;
  determine required computing resources according to the current processor load, computing resources corresponding to a total frequency of each processor core;
  obtain priori power values of each processor core at different frequencies;
    determine the number of processor cores and a frequency of each processor core according to the priori power values of each processor core at different frequencies, with a total frequency of each processor core satisfying the required computing resources and a total power value of each processor core being minimum;
  apply configurations of the number of processor cores and the frequency of each processor core to the processor cores by calling interfaces of a frequency governor and a hot-plug unit;
  wherein the computer program executed by the processor to obtain the priori power values of each processor core at the different frequencies is executed by the processor to:
  determine a frequency allocation strategy according to the priori power values of each processor core at different frequencies, with the total power value of each processor core corresponding to the frequency allocation strategy determined being minimum.

14. The non-transitory computer-readable storage medium of claim 13, wherein the computer program executed by the processor to detect the current processor load is executed by the processor to:
  obtain a processor load of each processor core in a current state; and
  determine the current processor load according to the processor load of each processor core in the current state.

15. The non-transitory computer-readable storage medium of claim 13, wherein the computer program executed by the processor to obtain the priori power values of each processor core at the different frequencies is executed by the processor to:
  determine a correspondence between operating frequencies and power values of each processor core, the power values being exponentially related to the operating frequencies; and
  determine the power values of each processor core at different frequencies according to the correspondence.

16. The non-transitory computer-readable storage medium of claim 13, wherein the computer program is further executed by the processor to:
  determine the minimum number of required processor cores according to the current processor load;
  determine the maximum number of processor cores in a system;
  determine a selectable range of the number of processor cores according to the minimum number and the maximum number of processor cores; and
  determine a plurality of frequency allocation strategies according to a formula $N_{c\_x}*F_x=N_{c\_min}*F_{max}$,
  wherein the value of $N_{c\_x}$ is in $[N_{c\_min}, N_{c\_max}]$, $N_{c\_min}$ is the minimum number of required processor cores, $N_{c\_max}$ is the maximum number of processor cores in the system, $F_{max}$ is the maximum frequency of a single processor core, and $F_x$ is a frequency allocated to a processor core; and
  wherein the computer program executed by the processor to obtain the priori power values of each processor core at the different frequencies is executed by the processor to:
  determine a frequency allocation strategy according to the priori power values of each processor core at different frequencies, with the total power value of each processor core corresponding to the frequency allocation strategy determined being minimum.

* * * * *